United States Patent
Goodman et al.

(10) Patent No.: US 12,536,401 B2
(45) Date of Patent: Jan. 27, 2026

(54) SECURITY TAG

(71) Applicant: Sensormatic Electronics, LLC, Boca Raton, FL (US)

(72) Inventors: Katherine Fay Goodman, Irvine, CA (US); Tamlyn Jaret Jones, Rancho Mission Viejo, CA (US); Marc H. Blanchenay, Lighthouse Point, FL (US); Olivier Bruno Sommer, Knoxville, TN (US); Lauri Johannes Huhtasalo, Tampere (FI)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 18/350,507

(22) Filed: Jul. 11, 2023

(65) Prior Publication Data
US 2024/0242058 A1    Jul. 18, 2024

Related U.S. Application Data (60) Provisional application No. 63/374,138, filed on Aug. 31, 2022.

(51) Int. Cl.
G06K 19/077    (2006.01)
(52) U.S. Cl.
CPC .............. *G06K 19/07773* (2013.01)
(58) Field of Classification Search
CPC ............... G06K 19/07773; G06K 19/07798
USPC ............................................... 235/492
See application file for complete search history.

(56) References Cited

U.S. PATENT DOCUMENTS

| | | | |
|---|---|---|---|
| 4,505,773 | A | 3/1985 | Sato et al. |
| 5,963,144 | A | 10/1999 | Kruest |
| 6,147,655 | A | 11/2000 | Roesner |
| 6,152,348 | A | 11/2000 | Finn et al. |
| 6,229,443 | B1 | 5/2001 | Roesner |
| 6,265,976 | B1 | 7/2001 | Roesner |
| 6,646,336 | B1 | 11/2003 | Marmaropoulos et al. |
| 6,690,264 | B2 | 2/2004 | Dalglish |
| 6,967,579 | B1 | 11/2005 | Elizondo |
| 6,982,190 | B2 | 1/2006 | Roesner |
| 7,026,935 | B2 | 4/2006 | Diorio et al. |
| 7,026,936 | B2 | 4/2006 | Roesner |
| 7,030,786 | B2 | 4/2006 | Kaplan et al. |

(Continued)

FOREIGN PATENT DOCUMENTS

| | | |
|---|---|---|
| DE | 102004027978 A1 | 12/2005 |
| DE | 102006051379 A1 | 4/2008 |

(Continued)

OTHER PUBLICATIONS

International Search Report and Written Opinion in PCT/EP2023/071160, mailed Nov. 10, 2023, 15 pages.

(Continued)

*Primary Examiner* — Ahshik Kim
(74) *Attorney, Agent, or Firm* — ArentFox Schiff LLP (57) ABSTRACT

A security tag includes: an elongated inlay portion; an antenna mounted on the elongated inlay portion; and a radio frequency identification (RFID) circuit coupled with the antenna. The security tag may be encapsulated within an elongated textile protective sleeve. At least one of the elongated inlay portion, the antenna or the RFID circuit are adapted to dissolve in water.

23 Claims, 5 Drawing Sheets

(56) References Cited

U.S. PATENT DOCUMENTS

| | | |
|---|---|---|
| 7,038,544 B2 | 5/2006 | Diorio et al. |
| 7,038,573 B2 | 5/2006 | Bann |
| 7,038,603 B2 | 5/2006 | Diorio et al. |
| 7,049,964 B2 | 5/2006 | Hyde et al. |
| 7,054,595 B2 | 5/2006 | Bann |
| 7,061,324 B2 | 6/2006 | Diorio et al. |
| 7,064,653 B2 | 6/2006 | Dalglish |
| 7,107,022 B1 | 9/2006 | Thomas et al. |
| 7,116,240 B2 | 10/2006 | Hyde |
| 7,119,664 B2 | 10/2006 | Roesner |
| 7,120,550 B2 | 10/2006 | Diorio et al. |
| 7,123,171 B2 | 10/2006 | Kaplan et al. |
| 7,158,408 B2 | 1/2007 | Roesner et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,456 B2 | 4/2007 | Krappe et al. |
| 7,199,663 B2 | 4/2007 | Diorio et al. |
| 7,212,446 B2 | 5/2007 | Diorio et al. |
| 7,215,251 B2 | 5/2007 | Hyde |
| D543,976 S | 6/2007 | Oliver |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,253,735 B2 | 8/2007 | Gengel et al. |
| 7,283,037 B2 | 10/2007 | Diorio et al. |
| 7,304,579 B2 | 12/2007 | Diorio et al. |
| 7,307,528 B2 | 12/2007 | Glidden et al. |
| 7,307,529 B2 | 12/2007 | Gutnik et al. |
| 7,307,534 B2 | 12/2007 | Pesavento |
| 7,312,622 B2 | 12/2007 | Hyde et al. |
| D562,810 S | 2/2008 | Oliver |
| D563,397 S | 3/2008 | Oliver |
| 7,375,626 B2 | 5/2008 | Ening |
| 7,380,190 B2 | 5/2008 | Hara et al. |
| D570,337 S | 6/2008 | Oliver |
| 7,382,257 B2 | 6/2008 | Thomas et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,469,126 B2 | 12/2008 | Miettinen et al. |
| 7,472,835 B2 | 1/2009 | Diorio et al. |
| D586,336 S | 2/2009 | Oliver |
| 7,489,248 B2 | 2/2009 | Gengel et al. |
| 7,492,164 B2 | 2/2009 | Hanhikorpi et al. |
| 7,492,326 B1 | 2/2009 | Bodlovic et al. |
| D587,691 S | 3/2009 | Oliver |
| 7,501,953 B2 | 3/2009 | Diorio et al. |
| 7,510,117 B2 | 3/2009 | Esterberg |
| 7,518,516 B2 | 4/2009 | Azevedo et al. |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,561,866 B2 | 7/2009 | Oliver et al. |
| 7,589,618 B2 | 9/2009 | Diorio et al. |
| 7,592,897 B2 | 9/2009 | Diorio et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,651,882 B1 | 1/2010 | Bockorick et al. |
| D610,576 S | 2/2010 | Oliver |
| 7,667,231 B2 | 2/2010 | Hyde et al. |
| 7,667,589 B2 | 2/2010 | Desmons et al. |
| D611,037 S | 3/2010 | Oliver |
| 7,679,957 B2 | 3/2010 | Ma et al. |
| D613,276 S | 4/2010 | Oliver |
| 7,696,882 B1 | 4/2010 | Rahimi et al. |
| 7,696,947 B2 | 4/2010 | Gallschuetz et al. |
| 7,714,593 B2 | 5/2010 | Varpula et al. |
| 7,715,236 B2 | 5/2010 | Hyde |
| 7,719,406 B2 | 5/2010 | Bajahr |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,787,837 B2 | 8/2010 | Mikuteit |
| 7,804,411 B2 | 9/2010 | Copeland |
| 7,808,387 B1 | 10/2010 | Kuhn |
| 7,808,823 B2 | 10/2010 | Ma et al. |
| 7,812,729 B2 | 10/2010 | Copeland |
| 7,830,262 B1 | 11/2010 | Diorio et al. |
| 7,830,322 B1 | 11/2010 | Oliver et al. |
| 7,843,399 B2 | 11/2010 | Stobbe |
| 7,872,582 B1 | 1/2011 | Diorio |
| 7,884,725 B2 | 2/2011 | Kruest et al. |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,364 B2 | 6/2011 | Kriebel et al. |
| 7,973,643 B2 | 7/2011 | Hyde et al. |
| 7,973,645 B1 | 7/2011 | Moretti et al. |
| 7,973,661 B2 | 7/2011 | Copeland |
| 7,975,414 B2 | 7/2011 | Ritamaeki et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,994,897 B2 | 8/2011 | Azevedo et al. |
| 7,999,675 B2 | 8/2011 | Diorio et al. |
| 8,028,923 B2 | 10/2011 | Shafran et al. |
| 8,044,774 B1 | 10/2011 | Diorio |
| 8,044,801 B1 | 10/2011 | Hyde et al. |
| 8,056,814 B2 | 11/2011 | Martin et al. |
| 8,063,740 B1 | 11/2011 | Diorio et al. |
| 8,072,327 B2 | 12/2011 | Enyedy et al. |
| 8,072,329 B1 | 12/2011 | Srinivas et al. |
| 8,072,332 B2 | 12/2011 | Forster |
| 8,077,013 B2 | 12/2011 | Cooper |
| 8,082,556 B1 | 12/2011 | Aiouaz et al. |
| 8,093,996 B2 | 1/2012 | Heurtier |
| 8,098,134 B2 | 1/2012 | Azevedo et al. |
| 8,115,590 B1 | 2/2012 | Diorio et al. |
| 8,115,597 B1 | 2/2012 | Oliver et al. |
| 8,115,632 B1 | 2/2012 | Rahimi et al. |
| 8,120,494 B1 | 2/2012 | Aiouaz et al. |
| 8,134,451 B1 | 3/2012 | Diorio |
| 8,154,385 B2 | 4/2012 | Aiouaz et al. |
| 8,174,367 B1 | 5/2012 | Diorio |
| 8,179,265 B2 | 5/2012 | Elizondo et al. |
| 8,188,867 B2 | 5/2012 | Rietzler |
| 8,188,927 B1 | 5/2012 | Koepp et al. |
| 8,193,912 B1 | 6/2012 | Gutnik et al. |
| 8,201,748 B2 | 6/2012 | Koepp et al. |
| 8,224,610 B2 | 7/2012 | Diorio et al. |
| 8,228,175 B1 | 7/2012 | Diorio et al. |
| 8,237,562 B1 | 8/2012 | Picasso et al. |
| 8,244,201 B2 | 8/2012 | Oliver et al. |
| 8,258,918 B1 | 9/2012 | Diorio et al. |

(56) References Cited

U.S. PATENT DOCUMENTS

| | | |
|---|---|---|
| 8,258,955 B1 | 9/2012 | Hyde et al. |
| 8,260,241 B1 | 9/2012 | Hyde |
| 8,279,045 B2 | 10/2012 | Diorio et al. |
| 8,294,582 B1 | 10/2012 | Humes et al. |
| 8,303,389 B2 | 11/2012 | Wilm |
| 8,305,764 B2 | 11/2012 | Rietzler |
| 8,325,014 B1 | 12/2012 | Sundstrom et al. |
| 8,325,042 B1 | 12/2012 | Hyde et al. |
| 8,326,256 B1 | 12/2012 | Kuhn |
| 8,334,751 B2 | 12/2012 | Azevedo et al. |
| 8,342,402 B2 | 1/2013 | Kriebel et al. |
| 8,344,857 B1 | 1/2013 | Oliver et al. |
| 8,350,665 B1 | 1/2013 | Sundstrom et al. |
| 8,350,702 B2 | 1/2013 | Copeland et al. |
| 8,354,917 B2 | 1/2013 | Diorio et al. |
| 8,390,425 B1 | 3/2013 | Cooper et al. |
| 8,390,430 B1 | 3/2013 | Sundstrom et al. |
| 8,390,431 B1 | 3/2013 | Diorio |
| 8,391,785 B2 | 3/2013 | Hyde et al. |
| 8,427,315 B2 | 4/2013 | Aiouaz et al. |
| 8,428,515 B1 | 4/2013 | Oliver |
| 8,446,258 B2 | 5/2013 | Diorio et al. |
| 8,448,874 B2 | 5/2013 | Koskelainen |
| 8,451,095 B2 | 5/2013 | Azevedo et al. |
| 8,451,119 B1 | 5/2013 | Rahimi et al. |
| 8,451,673 B1 | 5/2013 | Pesavento et al. |
| 8,471,708 B1 | 6/2013 | Diorio et al. |
| 8,511,569 B1 | 8/2013 | Koepp et al. |
| 8,536,075 B2 | 9/2013 | Leonard |
| 8,570,157 B1 | 10/2013 | Diorio et al. |
| 8,587,411 B1 | 11/2013 | Diorio |
| 8,593,257 B1 | 11/2013 | Diorio et al. |
| D695,278 S | 12/2013 | Koskelainen |
| 8,600,298 B1 | 12/2013 | Hyde et al. |
| 8,610,580 B2 | 12/2013 | Elizondo et al. |
| 8,614,506 B1 | 12/2013 | Fassett et al. |
| 8,616,459 B2 | 12/2013 | Sykkoe et al. |
| 8,661,652 B1 | 3/2014 | Koepp et al. |
| 8,665,074 B1 | 3/2014 | Diorio et al. |
| 8,669,872 B1 | 3/2014 | Stanford et al. |
| 8,669,874 B2 | 3/2014 | Kruest et al. |
| 8,680,973 B2 | 3/2014 | Kruest et al. |
| 8,698,629 B1 | 4/2014 | Stanford et al. |
| 8,717,145 B2 | 5/2014 | Ho et al. |
| D710,337 S | 8/2014 | Koskelainen |
| 8,796,865 B1 | 8/2014 | Fassett et al. |
| 8,810,376 B1 | 8/2014 | Picasso et al. |
| 8,816,909 B2 | 8/2014 | Jiang et al. |
| 8,830,038 B1 | 9/2014 | Stanford et al. |
| 8,830,064 B1 | 9/2014 | Stanford et al. |
| 8,830,065 B1 | 9/2014 | Stanford et al. |
| 8,866,594 B1 | 10/2014 | Diorio et al. |
| 8,866,595 B1 | 10/2014 | Diorio et al. |
| 8,866,596 B1 | 10/2014 | Diorio et al. |
| 8,872,636 B1 | 10/2014 | Diorio et al. |
| 8,881,373 B1 | 11/2014 | Koepp et al. |
| 8,902,627 B1 | 12/2014 | Pesavento et al. |
| 8,907,795 B2 | 12/2014 | Soto et al. |
| 8,917,179 B2 | 12/2014 | Alicot et al. |
| 8,917,219 B2 | 12/2014 | Semar et al. |
| 8,952,792 B1 | 2/2015 | Srinivas et al. |
| 8,967,486 B2 | 3/2015 | Chandramowle et al. |
| 8,988,199 B1 | 3/2015 | Moretti et al. |
| 8,991,714 B2 | 3/2015 | Elizondo et al. |
| 8,998,097 B2 | 4/2015 | Launiainen |
| 9,000,835 B1 | 4/2015 | Peach et al. |
| D729,780 S | 5/2015 | Koskelainen et al. |
| 9,024,729 B1 | 5/2015 | Diorio et al. |
| 9,024,731 B1 | 5/2015 | Diorio et al. |
| 9,031,504 B1 | 5/2015 | Hyde et al. |
| 9,035,748 B2 | 5/2015 | Greefkes |
| 9,053,400 B2 | 6/2015 | Diorio et al. |
| 9,058,554 B2 | 6/2015 | Kervinen et al. |
| 9,064,196 B1 | 6/2015 | Gutnik et al. |
| 9,064,199 B2 | 6/2015 | Nitta |
| 9,070,066 B1 | 6/2015 | Oliver et al. |
| 9,076,049 B1 | 7/2015 | Moretti et al. |
| 9,087,281 B2 | 7/2015 | Maguire et al. |
| 9,087,282 B1 | 7/2015 | Hyde et al. |
| 9,104,923 B1 | 8/2015 | Stanford et al. |
| 9,111,283 B1 | 8/2015 | Diorio et al. |
| 9,129,168 B1 | 9/2015 | Diorio et al. |
| 9,129,169 B1 | 9/2015 | Diorio et al. |
| 9,135,476 B2 | 9/2015 | Virtanen |
| 9,142,881 B1 | 9/2015 | Oliver et al. |
| 9,165,170 B1 | 10/2015 | Gutnik et al. |
| 9,178,277 B1 | 11/2015 | Moretti et al. |
| 9,183,717 B1 | 11/2015 | Diorio et al. |
| 9,189,904 B1 | 11/2015 | Diorio et al. |
| 9,197,294 B2 | 11/2015 | Alicot et al. |
| 9,202,093 B2 | 12/2015 | Nummila et al. |
| 9,213,870 B1 | 12/2015 | Diorio et al. |
| 9,213,871 B1 | 12/2015 | Diorio et al. |
| 9,215,809 B2 | 12/2015 | Nieland et al. |
| 9,239,941 B1 | 1/2016 | Diorio |
| 9,247,634 B2 | 1/2016 | Kruest et al. |
| 9,253,876 B2 | 2/2016 | Elizondo et al. |
| 9,281,552 B2 | 3/2016 | Virtanen |
| 9,299,586 B1 | 3/2016 | West et al. |
| 9,305,195 B1 | 4/2016 | Diorio et al. |
| 9,317,799 B1 | 4/2016 | Koepp et al. |
| 9,325,053 B2 | 4/2016 | Virtanen et al. |
| 9,330,284 B1 | 5/2016 | Diorio |
| 9,342,775 B2 | 5/2016 | Forster |
| 9,349,032 B1 | 5/2016 | Diorio et al. |
| 9,349,090 B1 | 5/2016 | Srinivas et al. |
| 9,373,012 B2 | 6/2016 | Pesavento et al. |
| 9,390,603 B2 | 7/2016 | Li et al. |
| 9,405,945 B1 | 8/2016 | Diorio et al. |
| 9,430,683 B1 | 8/2016 | Hyde |
| 9,454,680 B1 | 9/2016 | Diorio |
| 9,460,380 B1 | 10/2016 | Koepp et al. |
| 9,471,816 B1 | 10/2016 | Hyde et al. |
| 9,489,611 B1 | 11/2016 | Diorio et al. |
| 9,495,631 B1 | 11/2016 | Koepp et al. |
| 9,501,675 B1 | 11/2016 | Diorio et al. |
| 9,501,736 B2 | 11/2016 | Elizondo et al. |
| 9,503,160 B1 | 11/2016 | Hyde |
| 9,542,636 B2 | 1/2017 | Buehler |
| 9,565,022 B1 | 2/2017 | Robshaw et al. |
| 9,582,690 B2 | 2/2017 | Rietzler |
| 9,589,224 B2 | 3/2017 | Patterson et al. |
| 9,607,191 B1 | 3/2017 | Peach et al. |
| 9,607,286 B1 | 3/2017 | Diorio |
| 9,626,619 B2 | 4/2017 | Kruest et al. |
| 9,633,302 B1 | 4/2017 | Heinrich |
| 9,646,186 B1 | 5/2017 | Hyde et al. |
| 9,652,643 B1 | 5/2017 | Pesavento et al. |
| 9,690,949 B1 | 6/2017 | Diorio et al. |
| 9,691,243 B1 | 6/2017 | Diorio et al. |
| 9,697,387 B1 | 7/2017 | Bowman et al. |
| 9,715,605 B1 | 7/2017 | Sundstrom et al. |
| 9,740,891 B1 | 8/2017 | Robshaw et al. |
| 9,747,542 B2 | 8/2017 | Elizondo et al. |
| 9,767,333 B1 | 9/2017 | Diorio et al. |
| 9,773,133 B2 | 9/2017 | Oliver et al. |
| 9,773,201 B2 | 9/2017 | Shafran et al. |
| 9,779,599 B2 | 10/2017 | Sharpy et al. |
| 9,792,472 B1 | 10/2017 | Robshaw et al. |
| 9,792,543 B2 | 10/2017 | Kuschewski et al. |
| 9,805,223 B1 | 10/2017 | Bowman et al. |
| 9,805,235 B2 | 10/2017 | Kruest et al. |
| 9,818,084 B1 | 11/2017 | Diorio et al. |
| 9,831,724 B2 | 11/2017 | Copeland et al. |
| 9,846,794 B2 | 12/2017 | Greefkes |
| 9,846,833 B1 | 12/2017 | Koepp et al. |
| 9,852,319 B1 | 12/2017 | Pesavento et al. |
| 9,875,438 B1 | 1/2018 | Diorio et al. |
| 9,881,186 B1 | 1/2018 | Sundstrom et al. |
| 9,881,473 B1 | 1/2018 | Diorio et al. |
| 9,886,658 B1 | 2/2018 | Stanford et al. |
| 9,887,843 B1 | 2/2018 | Robshaw et al. |
| 9,911,017 B2 | 3/2018 | Uhl et al. |
| 9,911,018 B1 | 3/2018 | Heinrich et al. |

(56) References Cited

U.S. PATENT DOCUMENTS

| | | |
|---|---|---|
| 9,916,483 B1 | 3/2018 | Robshaw et al. |
| 9,916,484 B2 | 3/2018 | Pesavento et al. |
| 9,922,215 B2 | 3/2018 | Huhtasalo et al. |
| 9,928,388 B1 | 3/2018 | Bowman et al. |
| 9,928,390 B1 | 3/2018 | Diorio et al. |
| 9,940,490 B1 | 4/2018 | Robshaw et al. |
| 9,953,198 B2 | 4/2018 | Khler et al. |
| 9,954,278 B1 | 4/2018 | Moretti et al. |
| 9,959,435 B1 | 5/2018 | Diorio et al. |
| 9,959,494 B1 | 5/2018 | Shyamkumar et al. |
| 9,977,932 B2 | 5/2018 | Rietzler |
| 10,002,266 B1 | 6/2018 | Hyde et al. |
| 10,013,587 B1 | 7/2018 | Pesavento et al. |
| 10,037,444 B1 | 7/2018 | Sundstrom et al. |
| 10,043,046 B1 | 8/2018 | Robshaw et al. |
| 10,049,317 B1 | 8/2018 | Diorio et al. |
| 10,061,950 B1 | 8/2018 | Pesavento et al. |
| 10,068,167 B2 | 9/2018 | Huhtasalo |
| 10,084,597 B1 | 9/2018 | Robshaw et al. |
| 10,116,033 B1 | 10/2018 | Koepp et al. |
| 10,121,033 B1 | 11/2018 | Robshaw et al. |
| 10,133,894 B2 | 11/2018 | Kruest et al. |
| 10,146,969 B1 | 12/2018 | Diorio et al. |
| 10,169,625 B1 | 1/2019 | Diorio et al. |
| 10,186,127 B1 | 1/2019 | Diorio et al. |
| 10,204,245 B1 | 2/2019 | Diorio et al. |
| 10,204,246 B1 | 2/2019 | Maguire et al. |
| 10,235,545 B2 | 3/2019 | Kruest et al. |
| 10,262,167 B2 | 4/2019 | Nyalamadugu et al. |
| 10,311,351 B1 | 6/2019 | Diorio et al. |
| 10,311,353 B1 | 6/2019 | Diorio et al. |
| 10,325,125 B1 | 6/2019 | Pesavento et al. |
| 10,331,993 B1 | 6/2019 | Koepp et al. |
| 10,339,436 B2 | 7/2019 | Huhtasalo |
| 10,373,038 B1 | 8/2019 | Stanford |
| 10,373,115 B1 | 8/2019 | Diorio et al. |
| 10,402,710 B1 | 9/2019 | Diorio et al. |
| 10,417,085 B1 | 9/2019 | Diorio |
| 10,417,464 B2 | 9/2019 | Huhtasalo et al. |
| 10,430,623 B1 | 10/2019 | Pesavento et al. |
| 10,445,535 B1 | 10/2019 | Hyde et al. |
| D865,726 S | 11/2019 | Oliver |
| 10,474,851 B2 | 11/2019 | Greefkes |
| RE47,755 E | 12/2019 | Hyde et al. |
| 10,521,768 B1 | 12/2019 | Diorio et al. |
| 10,546,162 B1 | 1/2020 | Diorio |
| 10,558,828 B2 | 2/2020 | Martinez et al. |
| 10,572,703 B1 | 2/2020 | Shyamkumar et al. |
| 10,572,789 B1 | 2/2020 | Stanford et al. |
| D879,077 S | 3/2020 | Oliver |
| 10,600,298 B1 | 3/2020 | Diorio et al. |
| 10,650,201 B1 | 5/2020 | Maguire et al. |
| 10,650,202 B1 | 5/2020 | Robshaw et al. |
| 10,650,346 B1 | 5/2020 | Pesavento et al. |
| 10,664,670 B1 | 5/2020 | Diorio et al. |
| D887,400 S | 6/2020 | Oliver |
| 10,679,019 B1 | 6/2020 | Thomas et al. |
| 10,679,115 B2 | 6/2020 | Huhtasalo |
| 10,699,178 B1 | 6/2020 | Diorio et al. |
| 10,713,453 B1 | 7/2020 | Diorio et al. |
| 10,713,549 B1 | 7/2020 | Peach et al. |
| 10,719,671 B1 | 7/2020 | Robshaw et al. |
| 10,720,700 B1 | 7/2020 | Moretti et al. |
| 10,733,395 B1 | 8/2020 | Diorio et al. |
| 10,740,574 B1 | 8/2020 | Stanford et al. |
| 10,776,198 B1 | 9/2020 | Diorio |
| 10,783,424 B1 | 9/2020 | Trivelpiece et al. |
| 10,790,160 B2 | 9/2020 | Singleton et al. |
| 10,819,319 B1 | 10/2020 | Hyde |
| 10,824,824 B1 | 11/2020 | Diorio |
| 10,846,583 B1 | 11/2020 | Koepp et al. |
| 10,860,819 B1 | 12/2020 | Pesavento et al. |
| 10,878,371 B1 | 12/2020 | Stanford et al. |
| 10,878,685 B1 | 12/2020 | Diorio et al. |
| 10,885,417 B1 | 1/2021 | Stanford et al. |
| 10,885,421 B1 | 1/2021 | Diorio et al. |
| 10,902,308 B2 | 1/2021 | Gire et al. |
| 10,916,114 B1 | 2/2021 | Diorio et al. |
| 10,929,734 B1 | 2/2021 | Hyde et al. |
| 10,936,929 B1 | 3/2021 | Diorio et al. |
| 10,956,693 B1 | 3/2021 | Shyamkumar et al. |
| 10,995,523 B2 | 5/2021 | Claeys et al. |
| 11,017,187 B1 | 5/2021 | Thomas et al. |
| 11,017,349 B1 | 5/2021 | Diorio et al. |
| 11,024,936 B1 | 6/2021 | Koepp et al. |
| 11,062,190 B1 | 7/2021 | Diorio et al. |
| 11,107,034 B1 | 8/2021 | Pesavento et al. |
| D929,975 S | 9/2021 | Abdul Rahman |
| 11,120,320 B1 | 9/2021 | Robshaw et al. |
| 11,132,589 B2 | 9/2021 | Chandramowle et al. |
| 11,188,803 B1 | 11/2021 | Patil et al. |
| 11,200,387 B1 | 12/2021 | Stanford et al. |
| 11,232,340 B1 | 1/2022 | Diorio et al. |
| 11,244,282 B1 | 2/2022 | Diorio et al. |
| 11,259,443 B1 | 2/2022 | T. Kunasekaran et al. |
| 11,282,357 B2 | 3/2022 | Claeys et al. |
| 11,288,564 B1 | 3/2022 | Koepp et al. |
| 11,300,467 B2 | 4/2022 | Boellaard et al. |
| 11,321,547 B1 | 5/2022 | Pesavento et al. |
| 11,341,343 B1 | 5/2022 | Diorio |
| 11,341,837 B1 | 5/2022 | Diorio et al. |
| 11,361,174 B1 | 6/2022 | Robshaw et al. |
| 11,403,505 B1 | 8/2022 | Diorio et al. |
| 11,423,278 B1 | 8/2022 | Koepp et al. |
| 11,443,160 B2 | 9/2022 | Trivelpiece et al. |
| 11,461,570 B1 | 10/2022 | Shyamkumar et al. |
| 11,481,591 B1 | 10/2022 | Peach et al. |
| 11,481,592 B1 | 10/2022 | Diorio et al. |
| 11,514,254 B1 | 11/2022 | Diorio |
| 11,514,255 B1 | 11/2022 | Thomas et al. |
| 11,519,200 B2 | 12/2022 | Claeys et al. |
| 2002/0097143 A1 | 7/2002 | Dalglish |
| 2004/0192011 A1 | 9/2004 | Roesner |
| 2004/0195593 A1 | 10/2004 | Diorio et al. |
| 2005/0012616 A1 | 1/2005 | Forster et al. |
| 2005/0052281 A1 | 3/2005 | Bann |
| 2005/0054293 A1 | 3/2005 | Bann |
| 2005/0057341 A1 | 3/2005 | Roesner |
| 2005/0058292 A1 | 3/2005 | Diorio et al. |
| 2005/0068179 A1 | 3/2005 | Roesner |
| 2005/0068180 A1 | 3/2005 | Miettinen et al. |
| 2005/0099269 A1 | 5/2005 | Diorio et al. |
| 2005/0099270 A1 | 5/2005 | Diorio et al. |
| 2005/0140448 A1 | 6/2005 | Diorio et al. |
| 2005/0140449 A1 | 6/2005 | Diorio et al. |
| 2005/0162233 A1 | 7/2005 | Diorio et al. |
| 2005/0185460 A1 | 8/2005 | Roesner et al. |
| 2005/0200402 A1 | 9/2005 | Diorio et al. |
| 2005/0200415 A1 | 9/2005 | Diorio et al. |
| 2005/0200416 A1 | 9/2005 | Diorio et al. |
| 2005/0200417 A1 | 9/2005 | Diorio et al. |
| 2005/0212674 A1 | 9/2005 | Desmons et al. |
| 2005/0225433 A1 | 10/2005 | Diorio et al. |
| 2005/0225434 A1 | 10/2005 | Diorio et al. |
| 2005/0225435 A1 | 10/2005 | Diorio et al. |
| 2005/0225436 A1 | 10/2005 | Diorio et al. |
| 2005/0225447 A1 | 10/2005 | Diorio et al. |
| 2005/0237157 A1 | 10/2005 | Cooper et al. |
| 2005/0237158 A1 | 10/2005 | Cooper et al. |
| 2005/0237159 A1 | 10/2005 | Cooper et al. |
| 2005/0237162 A1 | 10/2005 | Hyde et al. |
| 2005/0237843 A1 | 10/2005 | Hyde |
| 2005/0237844 A1 | 10/2005 | Hyde |
| 2005/0240369 A1 | 10/2005 | Diorio et al. |
| 2005/0240370 A1 | 10/2005 | Diorio et al. |
| 2005/0240739 A1 | 10/2005 | Pesavento |
| 2005/0269408 A1 | 12/2005 | Esterberg et al. |
| 2005/0270141 A1 | 12/2005 | Dalglish |
| 2005/0270185 A1 | 12/2005 | Esterberg |
| 2005/0270189 A1 | 12/2005 | Kaplan et al. |
| 2005/0275533 A1 | 12/2005 | Hanhikorpi et al. |
| 2005/0280505 A1 | 12/2005 | Humes et al. |
| 2005/0280506 A1 | 12/2005 | Lobanov et al. |
| 2005/0280507 A1 | 12/2005 | Diorio et al. |

(56) References Cited

U.S. PATENT DOCUMENTS

| | | |
|---|---|---|
| 2006/0033622 A1 | 2/2006 | Hyde et al. |
| 2006/0049917 A1 | 3/2006 | Hyde et al. |
| 2006/0049928 A1 | 3/2006 | Ening |
| 2006/0055620 A1 | 3/2006 | Oliver et al. |
| 2006/0071758 A1 | 4/2006 | Cooper et al. |
| 2006/0071759 A1 | 4/2006 | Cooper et al. |
| 2006/0071793 A1 | 4/2006 | Pesavento |
| 2006/0082442 A1 | 4/2006 | Sundstrom |
| 2006/0086810 A1 | 4/2006 | Diorio et al. |
| 2006/0098765 A1 | 5/2006 | Thomas et al. |
| 2006/0125505 A1 | 6/2006 | Glidden et al. |
| 2006/0125506 A1 | 6/2006 | Hara et al. |
| 2006/0125507 A1 | 6/2006 | Hyde et al. |
| 2006/0125508 A1 | 6/2006 | Glidden et al. |
| 2006/0133140 A1 | 6/2006 | Gutnik et al. |
| 2006/0133175 A1 | 6/2006 | Gutnik et al. |
| 2006/0141884 A1* | 6/2006 | Haque .................. B32B 5/06 442/361 |
| 2006/0145855 A1 | 7/2006 | Diorio et al. |
| 2006/0163370 A1 | 7/2006 | Diorio et al. |
| 2006/0164214 A1 | 7/2006 | Bajahr |
| 2006/0186960 A1 | 8/2006 | Diorio et al. |
| 2006/0187031 A1 | 8/2006 | Moretti et al. |
| 2006/0187094 A1 | 8/2006 | Kaplan et al. |
| 2006/0197668 A1 | 9/2006 | Oliver et al. |
| 2006/0199551 A1 | 9/2006 | Thomas et al. |
| 2006/0202831 A1 | 9/2006 | Horch |
| 2006/0206277 A1 | 9/2006 | Horch |
| 2006/0211386 A1 | 9/2006 | Thomas et al. |
| 2006/0220639 A1 | 10/2006 | Hyde |
| 2006/0221715 A1 | 10/2006 | Ma et al. |
| 2006/0224647 A1 | 10/2006 | Gutnik |
| 2006/0236203 A1 | 10/2006 | Diorio et al. |
| 2006/0244598 A1 | 11/2006 | Hyde et al. |
| 2006/0261952 A1 | 11/2006 | Kavounas et al. |
| 2006/0261953 A1 | 11/2006 | Diorio et al. |
| 2006/0261954 A1 | 11/2006 | Dietrich et al. |
| 2006/0261955 A1 | 11/2006 | Humes et al. |
| 2006/0261956 A1 | 11/2006 | Sundstrom et al. |
| 2007/0001856 A1 | 1/2007 | Diorio et al. |
| 2007/0024446 A1 | 2/2007 | Hyde et al. |
| 2007/0046432 A1 | 3/2007 | Aiouaz et al. |
| 2007/0052613 A1 | 3/2007 | Gallschuetz et al. |
| 2007/0060075 A1 | 3/2007 | Mikuteit |
| 2007/0109129 A1 | 5/2007 | Sundstrom et al. |
| 2007/0126584 A1 | 6/2007 | Hyde et al. |
| 2007/0136583 A1 | 6/2007 | Diorio et al. |
| 2007/0136584 A1 | 6/2007 | Diorio et al. |
| 2007/0136585 A1 | 6/2007 | Diorio et al. |
| 2007/0152073 A1 | 7/2007 | Esterberg |
| 2007/0164851 A1 | 7/2007 | Cooper |
| 2007/0172966 A1 | 7/2007 | Hyde et al. |
| 2007/0177738 A1 | 8/2007 | Diorio et al. |
| 2007/0180009 A1 | 8/2007 | Gutnik |
| 2007/0216533 A1 | 9/2007 | Hyde et al. |
| 2007/0218571 A1 | 9/2007 | Stoughton et al. |
| 2007/0220737 A1 | 9/2007 | Stoughton et al. |
| 2007/0221737 A2 | 9/2007 | Diorio et al. |
| 2007/0236331 A1 | 10/2007 | Thompson et al. |
| 2007/0236335 A1 | 10/2007 | Aiouaz et al. |
| 2007/0241762 A1 | 10/2007 | Varpula et al. |
| 2007/0296590 A1 | 12/2007 | Diorio et al. |
| 2007/0296603 A1 | 12/2007 | Diorio et al. |
| 2008/0006702 A2 | 1/2008 | Diorio et al. |
| 2008/0018489 A1 | 1/2008 | Kruest et al. |
| 2008/0024273 A1 | 1/2008 | Kruest et al. |
| 2008/0030342 A1 | 2/2008 | Elizondo et al. |
| 2008/0046492 A1 | 2/2008 | Sundstrom |
| 2008/0048833 A1 | 2/2008 | Oliver |
| 2008/0048867 A1 | 2/2008 | Oliver et al. |
| 2008/0084275 A1 | 4/2008 | Azevedo et al. |
| 2008/0094214 A1 | 4/2008 | Azevedo et al. |
| 2008/0136602 A1 | 6/2008 | Ma et al. |
| 2008/0197978 A1 | 8/2008 | Diorio et al. |
| 2008/0197979 A1 | 8/2008 | Enyedy et al. |
| 2008/0204195 A1 | 8/2008 | Diorio et al. |
| 2008/0258878 A1 | 10/2008 | Dietrich et al. |
| 2008/0258916 A1 | 10/2008 | Diorio et al. |
| 2008/0266098 A1 | 10/2008 | Aiouaz et al. |
| 2008/0297421 A1 | 12/2008 | Kriebel et al. |
| 2008/0314990 A1 | 12/2008 | Rietzler |
| 2009/0002132 A1 | 1/2009 | Diorio et al. |
| 2009/0015382 A1 | 1/2009 | Greefkes |
| 2009/0091424 A1 | 4/2009 | Rietzler |
| 2009/0123704 A1 | 5/2009 | Shafran et al. |
| 2009/0146790 A1* | 6/2009 | Speich ............ G06K 19/07783 340/10.1 |
| 2009/0237220 A1 | 9/2009 | Oliver et al. |
| 2009/0251293 A1 | 10/2009 | Azevedo et al. |
| 2010/0032900 A1 | 2/2010 | Wilm |
| 2010/0033297 A1 | 2/2010 | Patovirta |
| 2010/0060459 A1 | 3/2010 | Stole et al. |
| 2010/0079287 A1* | 4/2010 | Forster ............ G06K 19/07749 340/572.3 |
| 2010/0182129 A1 | 7/2010 | Hyde et al. |
| 2010/0226107 A1 | 9/2010 | Rietzler |
| 2010/0270382 A1 | 10/2010 | Koepp et al. |
| 2010/0305430 A1 | 12/2010 | Troesken |
| 2011/0062236 A1 | 3/2011 | Kriebel et al. |
| 2011/0155811 A1 | 6/2011 | Rietzler |
| 2011/0163849 A1 | 7/2011 | Kruest et al. |
| 2011/0163879 A1 | 7/2011 | Kruest et al. |
| 2011/0253794 A1 | 10/2011 | Koskelainen |
| 2011/0267254 A1 | 11/2011 | Semar et al. |
| 2011/0285511 A1 | 11/2011 | Maguire et al. |
| 2011/0309937 A1 | 12/2011 | Bunza et al. |
| 2012/0019358 A1 | 1/2012 | Azevedo et al. |
| 2012/0154121 A1 | 6/2012 | Azevedo et al. |
| 2012/0175621 A1 | 7/2012 | Baecklund et al. |
| 2012/0261477 A1 | 10/2012 | Elizondo et al. |
| 2012/0292399 A1 | 11/2012 | Launiainen |
| 2013/0105586 A1 | 5/2013 | Sykkoe et al. |
| 2013/0135080 A1 | 5/2013 | Virtanen |
| 2013/0135104 A1 | 5/2013 | Nikkanen |
| 2013/0163640 A1 | 6/2013 | Aiouaz et al. |
| 2013/0265139 A1 | 10/2013 | Nummila et al. |
| 2013/0277432 A1 | 10/2013 | Katworapattra et al. |
| 2013/0285795 A1 | 10/2013 | Virtanen et al. |
| 2013/0291375 A1 | 11/2013 | Virtanen et al. |
| 2014/0070010 A1 | 3/2014 | Diorio et al. |
| 2014/0073071 A1 | 3/2014 | Diorio et al. |
| 2014/0084460 A1 | 3/2014 | Nieland et al. |
| 2014/0103119 A1 | 4/2014 | Elizondo et al. |
| 2014/0111314 A1 | 4/2014 | Rietzler |
| 2014/0144992 A1 | 5/2014 | Diorio et al. |
| 2014/0263659 A1 | 9/2014 | Kervinen et al. |
| 2014/0317909 A1 | 10/2014 | Virtanen |
| 2015/0022323 A1 | 1/2015 | Kruest et al. |
| 2015/0024523 A1 | 1/2015 | Virtanen |
| 2015/0032569 A1 | 1/2015 | Samuli |
| 2015/0076238 A1 | 3/2015 | Koskelainen |
| 2015/0107092 A1 | 4/2015 | Bashan et al. |
| 2015/0115038 A1 | 4/2015 | Kuschewski et al. |
| 2015/0181696 A1 | 6/2015 | Elizondo et al. |
| 2015/0227832 A1 | 8/2015 | Diorio et al. |
| 2015/0235062 A1 | 8/2015 | Greefkes |
| 2015/0248604 A1 | 9/2015 | Diorio et al. |
| 2015/0262053 A1 | 9/2015 | Buehler |
| 2015/0278671 A1* | 10/2015 | Martin ................ G06K 19/027 29/601 |
| 2015/0356395 A1 | 12/2015 | Haring et al. |
| 2016/0034728 A1 | 2/2016 | Oliver et al. |
| 2016/0042206 A1 | 2/2016 | Pesavento et al. |
| 2016/0157348 A1 | 6/2016 | Elizondo et al. |
| 2016/0162776 A1 | 6/2016 | Kruest et al. |
| 2016/0180672 A1 | 6/2016 | Hoehn et al. |
| 2016/0203395 A1 | 7/2016 | Huhtasalo |
| 2016/0210548 A1 | 7/2016 | Blair |
| 2016/0214422 A1 | 7/2016 | Deyoung et al. |
| 2016/0233188 A1 | 8/2016 | Kriebel et al. |
| 2016/0321479 A1 | 11/2016 | Uhl et al. |
| 2016/0321528 A1* | 11/2016 | Elbaz ............ G06K 19/07773 |
| 2016/0336198 A1 | 11/2016 | Singleton et al. |
| 2016/0342821 A1 | 11/2016 | Nyalamadugu et al. |

(56) References Cited

U.S. PATENT DOCUMENTS

| | | |
|---|---|---|
| 2016/0342883 A1 | 11/2016 | Huhtasalo |
| 2017/0068882 A1 | 3/2017 | Elizondo et al. |
| 2017/0124363 A1 | 5/2017 | Rietzler |
| 2017/0169263 A1 | 6/2017 | Khler et al. |
| 2017/0235982 A1 | 8/2017 | Kruest et al. |
| 2017/0243032 A1 | 8/2017 | Pesavento et al. |
| 2017/0252227 A1 | 9/2017 | Prioleau et al. |
| 2017/0286819 A9 | 10/2017 | Huhtasalo |
| 2017/0337852 A1 | 11/2017 | Oster |
| 2017/0364716 A1 | 12/2017 | Huhtasalo et al. |
| 2018/0032774 A1 | 2/2018 | Kruest et al. |
| 2018/0096176 A1 | 4/2018 | Greefkes |
| 2018/0157874 A1 | 6/2018 | Huhtasalo et al. |
| 2018/0165485 A1 | 6/2018 | Martinez et al. |
| 2018/0268175 A1 | 9/2018 | Rietzler |
| 2019/0220724 A1 | 7/2019 | Huhtasalo |
| 2019/0251411 A1 | 8/2019 | Gire et al. |
| 2019/0391560 A1 | 12/2019 | Arene et al. |
| 2020/0249109 A1 | 8/2020 | Singleton et al. |
| 2020/0250388 A1 | 8/2020 | Vermunt et al. |
| 2020/0335475 A1 | 10/2020 | Rolland et al. |
| 2020/0381829 A1 | 12/2020 | Andia et al. |
| 2020/0394697 A1 | 12/2020 | Paolella et al. |
| 2021/0082266 A1 | 3/2021 | Chandramowle et al. |
| 2021/0215562 A1 | 7/2021 | Boellaard et al. |
| 2021/0241063 A1 | 8/2021 | Thirappa et al. |
| 2021/0338471 A1 | 11/2021 | Nolan et al. |
| 2022/0180014 A1 | 6/2022 | Barr et al. |
| 2022/0196500 A1 | 6/2022 | Singleton et al. |
| 2022/0284253 A1 | 9/2022 | Garcia et al. |
| 2022/0358337 A1 | 11/2022 | Diorio et al. |
| 2023/0084051 A1 | 3/2023 | De Backer |

FOREIGN PATENT DOCUMENTS

| | | |
|---|---|---|
| DE | 102007001411 A1 | 7/2008 |
| EP | 1060994 B1 | 9/2006 |
| EP | 2504796 B1 | 9/2015 |
| EP | 3319168 A1 | 5/2018 |
| EP | 3662534 A1 | 6/2020 |
| GB | 2053139 A | 2/1981 |
| WO | 2007/104634 A1 | 9/2007 |
| WO | 2019/175509 A1 | 9/2019 |
| WO | 2021138261 A1 | 7/2021 |
| WO | 2022003613 A2 | 1/2022 |

OTHER PUBLICATIONS

International Search Report and Written Opinion received for PCT Patent Application No. PCT/US2024/061150, mailed on Apr. 7, 2025, 13 pages.

International Search Report and Written Opinion received for PCT Patent Application No. PCT/US2024/061406, mailed on May 30, 2025, 24 pages.

International Search Report and Written Opinion received for PCT Patent Application No. PCT/US2024/061363, mailed on Jun. 3, 2025, 25 pages.

* cited by examiner

SECURITY TAG

CROSS-REFERENCE TO RELATED APPLICATION(S)

This application claims the benefit of U.S. Provisional Application No. 63/374,138, entitled "WATER SOLUBALE SECURITY TAG" and filed on Aug. 31, 2022, which is expressly incorporated by reference herein in the entirety.

FIELD

The present disclosure relates generally to security tags, such as a water soluble electronic article surveillance tag, which may be attached to or incorporated into an article, such as a textile or other items, and which may be at least partially dissolved in water during a wash cycle.

BACKGROUND

Electronic Article Surveillance (EAS) systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as a radio frequency identification (RFID) and/or an acousto-magnetic (AM) tag), also known as an EAS marker, that, when active, generates a response signal when passed through this interrogation zone. An antenna and receiver in the same or another "pedestal" detect this response signal and generate an alarm.

Additionally, permanent hidden/embedded tags in goods could be used for other purposes, such as, but not limited to, circular economy applications (new business models like renting clothes, or selling second hand clothes with known authenticity and pedigree). In many cases the same tag can be used for multiple purposes: security (anti-theft), circular economy, supply chain management, and/or inventory management.

One drawback of tagging goods with EAS markers and other security tags for purposes of theft prevention is that such tags can affect privacy of consumers. Consumers in many cases may be concerned about being tracked by an EAS marker.

Thus, improvements in efficient removal of security tags are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for providing security tags that are inserted into apparel items. In an aspect, the security tags may be at least partially dissolved in water during a wash cycle of apparel items in order to protect privacy of consumers, for example.

In an aspect, a security tag includes: an elongated inlay portion; an antenna mounted on the elongated inlay portion; and a radio frequency identification (RFID) circuit coupled with the antenna. The security tag may be encapsulated within an elongated textile protective sleeve. At least a portion of the security tag is adapted to dissolve in water. For example, in some aspects, at least one of the elongated inlay portion, the antenna, and/or the RFID circuit are adapted to dissolve in water.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a security tag, such as a passive radio frequency identification (RFID) tag, which is designed to be physically capable of withstanding tensile, compressive, and/or abrasive forces which occur while positioning and/or affixing the security tag into an item, yet is sufficiently flexible and/or soft so as to not be noticeable to a person wearing the item. Additionally, in an aspect, the security tag, which may be at least partially water-soluble, is configured to be incorporated into an interface between different layers of an item, such as a garment or article of clothing. Moreover, at least a portion of the security tag can be effectively removed from the item during a wash cycle of the item.

Turning now to the figures, example aspects are depicted with reference to one or more components described herein, where components in dashed lines may be optional.

Figure 1:
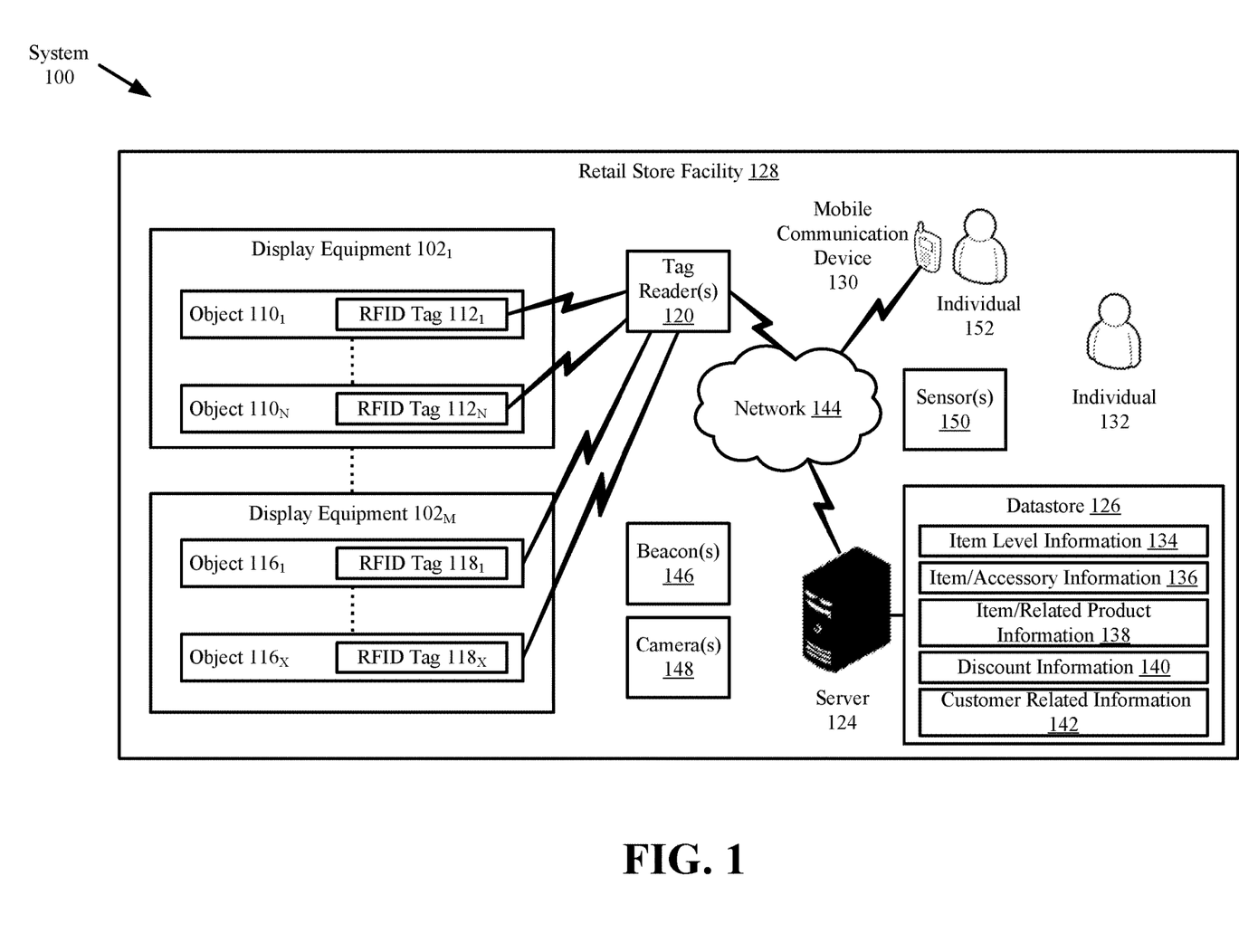
FIG. 1 is an illustration of an example architecture for a system according to some present aspects.

Referring now to FIG. 1, there is provided a schematic illustration of an example system 100 that is useful for understanding the present aspects. The present aspects are described herein in relation to a retail store environment. The present aspects are not limited in this regard and can be used in other environments. For example, the present aspects can be used in distribution centers, factories, and other commercial environments. Notably, the present aspects can be employed in any environment in which objects and/or items need to be located and/or tracked.

The system 100 is generally configured to allow: (a) improved inventory counts and surveillance of objects and/or items located within a facility, and/or (b) improved customer experiences. As shown in FIG. 1, system 100 comprises a Retail Store Facility ("RSF") 128 in which display equipment $102_1$-$102_M$ are disposed. The display equipment are provided for displaying objects (or items) $110_1$-$110_N$, $116_1$-$116_X$ to customers of the RSF 128. The display equipment may include, but are not limited to, shelves, article display cabinets, promotional displays, fixtures, and/or equipment securing areas of the RSF 128. The RSF 128 can also include emergency equipment (not shown), checkout counters, video cameras, people counters, and conventional electronic article surveillance (EAS) systems well known in the art, and therefore will not be described herein.

At least one tag reader 120 is provided to assist in counting and tracking locations of the objects $110_1$-$110_N$, $116_1$-$116_X$ within the RSF 128, and/or to perform a checkout process associated with a user purchasing a respective object. The tag reader 120 may comprise an RFID reader configured to read RFID tags. Such a tag read may include the tag reader 120 receiving an identifier (e.g., a unique identifier) of a respective RFID tag 112, which may be associated with an identifier of the object 110 to which the RFID tag 112 is attached.

RFID tags $112_1$-$112_N$, $118_1$-$118_X$ are respectively attached to the objects $110_1$-$110_N$, $116_1$-$116_X$ as described below. This attachment may be achieved by a structural configuration of the RFID tag to enable the attachment. The RFID tags $112_1$-$112_N$, $118_1$-$118_X$ can alternatively or additionally comprise dual-technology tags that have both EAS and RFID capabilities as described herein. In examples of the technology disclosed herein, the RFID tag is sewn or otherwise affixed into an object 110, for example into an interface between layers of the fabric/cloth of the object 110, which may be clothing or which may be another retail item.

Notably, the tag reader 120 may be placed at a known location within the RSF 128, for example, at an exit/entrance. By correlating the RFID tag reads of the tag reader 120 and the known location of the tag reader 120 within the RSF 128, the general location of objects $110_1$, . . . , $110_N$, $116_1$, . . . , $116_X$ may be determined within the RSF 128. The known coverage area of the tag reader 120 also facilitates object location determinations. Accordingly, RFID tag read information and tag reader location information is stored in a datastore 126. This information may be stored in the datastore 126 using a server 124 and a network 144 (e.g., an Intranet and/or Internet). Additionally, the tag reader 120 or another computer device, such as but not limited to a point of sale terminal, may read a respective RFID tag 112 during a check-out or payment process and confirm that the object 110 to which the RFID tag 112 is attached is the object being paid for in the check-out or point of sale transaction.

System 100 may also comprise a Mobile Communication Device ("MCD") 130. MCD 130 includes, but is not limited to, a cell phone, a smart phone, a table computer, a personal digital assistant, and/or a wearable device (e.g., a smart watch). In accordance with some examples, the MCD 130 has a software application installed thereon that is operative to facilitate the provision of various information (e.g., 134, 136, 138, 140, and/or 142) to the individual 152 and/or to facilitate the sale or purchase transaction.

The MCD 130 may generally be configured to provide a visual and/or auditory output of item level information 134, accessory information 136, related product information 138, discount information 140, and/or customer related information 142.

The MCD 130 may also be configured to read barcodes and/or the RFID tag 112. Information obtained from the barcode and/or RFID tag reads may be communicated from the MCD 130 to the server 124 via network 144. Similarly, the stored information (e.g., 134, 136, 138, 140, and/or 142) may be provided from the server 124 to the MCD 130 via the network 144. The network 144 may include an Intranet and/or the Internet.

Server 124 may be local to the RSF 128 as shown in FIG. 1 or remote from the RSF 128. It should be understood that server 124 may be configured to: write data to and read data from datastore 126, RFID tags $112_1$-$112_N$, $118_1$-$118_X$, and/or MCD 130; perform language and currency conversion operations using item level information 134 and/or accessory information 136 obtained from the datastore 126, RFID tags $112_1$-$112_N$, $118_1$-$118_X$, and/or MCD 130; perform data analytics based on inventory information (e.g., 134, 136, 138, 140, and/or 142), tag read information, MCD tacking information, and/or information 134-142; perform image processing using images captured by camera(s) 148; and/or determine locations of RFID tags $112_1$-$112_N$, $118_1$-$118_X$ and/or MCDs 130 in the RSF 128 using beacon(s) 146, tag reader 120, or other devices having known locations and/or antenna patterns.

In some examples, one or more beacons 146 transmitting a radio frequency (RF) signal (e.g., a second RF signal) other than the RFID interrogation signal are placed to cover a zone of interest (which in some cases may be also covered by a tag reader 120 placed to cover an RFID interrogation zone), e.g., at a portal (such as an entrance or exit) of the RSF 128.

The server 124 may update the information (e.g., 134, 136, 138, 140, and/or 142) output from the MCD 130 and/or the tag reader 120 and/or any other terminal and/or point of sale device that interacts with the RFID tag 112. Such information updating may be performed in response to instructions received from an associate (e.g., a retail store employee 132), in response to a detected change in the item level information 134, accessory information 136, and/or related product information 138, in response to a detection that an individual is in proximity to an RFID tag, and/or in response to any motion or movement of the RFID tag. For example, if a certain product is placed on sale, then the sale price for that product may be transmitted to MCD 130 via network 144 and/or RFID tag 112/118. The sale price may then be output from the MCD 130. It should be noted that the present aspects are not limited to the particulars of this example.

Although a single MCD 130 and/or a single server 124 is (are) shown in FIG. 1, the present aspects are not limited in this regard. More than one computing device may be implemented. In addition, the present aspects are not limited to the example system architecture described in relation to FIG. 1.

In some aspects, during operation of system 100, the content displayed on the display screen of the MCD 130 may be dynamically controlled based upon various tag or item related information and/or customer related information (e.g., mobile device identifier, mobile device location in RSF 128, and/or customer loyalty level). Tag or item level information 134 may include, but is not limited to, one or more of first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second, and fourth information may be derived based on sensor data generated by one or more sensors 150 local to the RFID tag. In other words, in some cases, the RFID tags $112_1$-$112_N$, $118_1$-$118_X$ may include one or more sensors 150 to detect their current locations, detect any individual in proximity thereto, and/or detect any motion or movement thereof. The sensors 150 may include, but are not limited to, an Inertial Measurement Unit ("IMU"), a vibration sensor, a light sensor, an accelerometer, a gyroscope, a proximity sensor, a microphone, and/or a beacon communication device. The third information may be stored local to the RFID tag(s) or in a remote datastore 126 as information 136, 138.

In those or other scenarios, a sensor embedded in the RFID tag 112/118 may detect when an individual 152 is handling the object in which the RFID tag 112/118 is inserted. When such a detection is made, the RFID tag 112/118 may retrieve the object's unique identifier from its local memory, and wirelessly communicates the same to the tag reader 120. The tag reader 120 may then pass the information to the server 124. The server 124 may use the object's unique identifier and the item/accessory relationship information (e.g., table) 136 to determine if there are any accessories associated therewith. If no accessories exist for the object, the server 124 may use the item level information 134 to determine one or more characteristics of the object. For example, the object may comprise a product of a specific brand. The server 124 may then use the item/related product information (e.g., table) 138 to identify: other products of the same type with the same characteristics; and/or other products that are typically used in conjunction with the object. Related product information for the identified related products may then be retrieved and provided to the MCD 130. The MCD 130 may output the related product information in a visual format and/or an auditory format. The individual 152 may perform user-software interactions with the MCD 130 to obtain further information related to the product of interest. The present solution is not limited to the particulars of this scenario.

Referring to FIGS. 2-5, an example architecture for a security tag 200 is shown. RFID tags $112_1$-$112_N$, $118_1$-$118_X$ are the same as or similar to security tag 200. As such, the discussion of security tag 200 is sufficient for understanding the RFID tags $112_1$-$112_N$, $118_1$-$118_X$ of FIG. 1. In some implementations, security tag 200 may be configured to perform operations such as but not limited to: (a) minimize power usage so as to extend a power source's life (e.g., a battery or a capacitor), (b) minimize collisions with other tags so that the tag of interest can be seen at given times, and/or (c) optimize useful information within an inventory system (e.g., communicate useful change information to a tag reader)

Notably, the security tag 200 may be designed to be relatively thin and relatively flexible so that it is hard to feel when inserted into an item (e.g., object $110_1$, . . . , $110_N$, $116_1$, . . . , or $116_X$ of FIG. 1). The object may include, but is not limited to, an article of clothing. In an aspect, at least one component of the security tag 200 may be water soluble.

Figure 2:
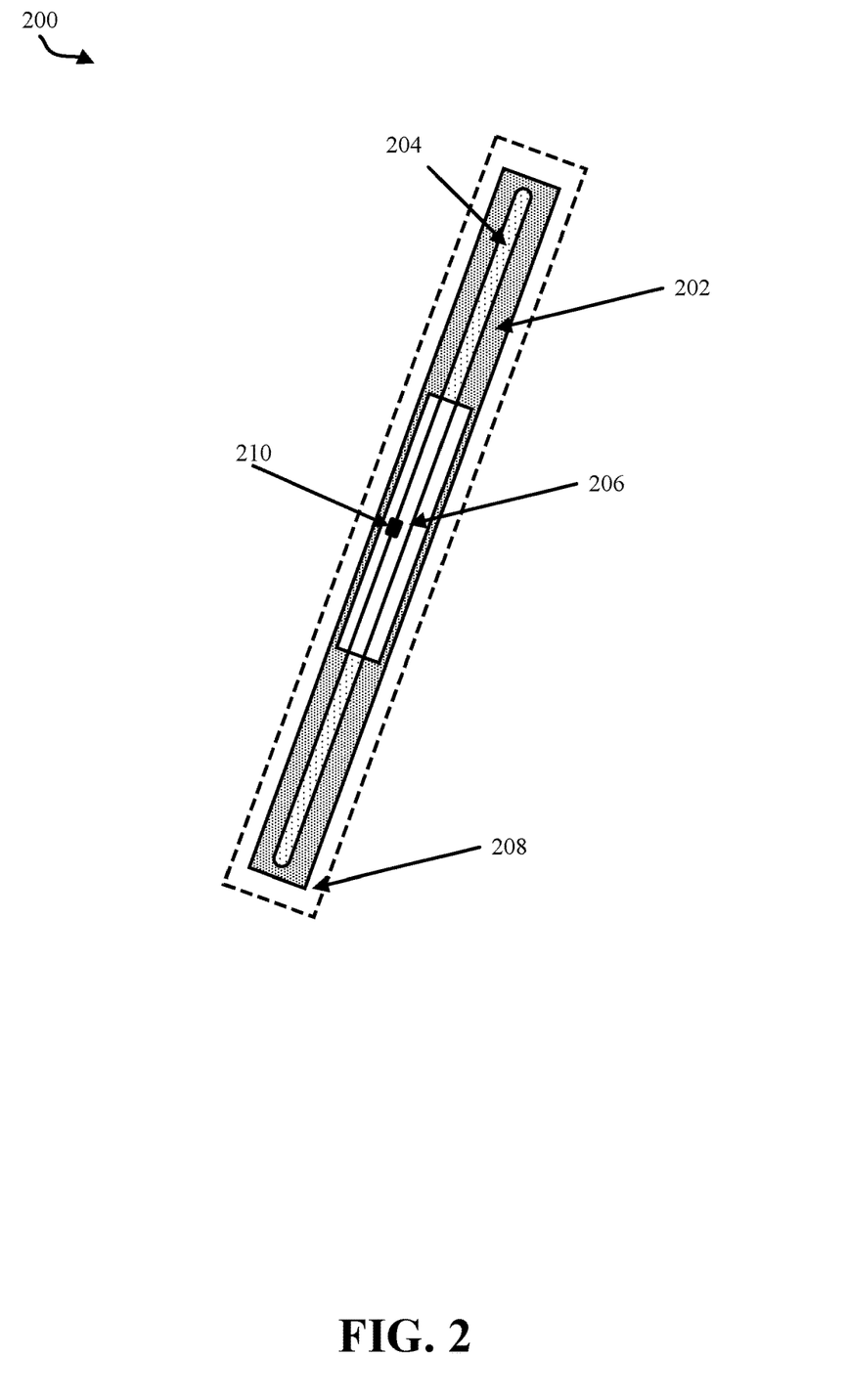
FIG. 2 is a partial cut-away isometric view of an example architecture for a tag according to some present aspects.
Figure 3:
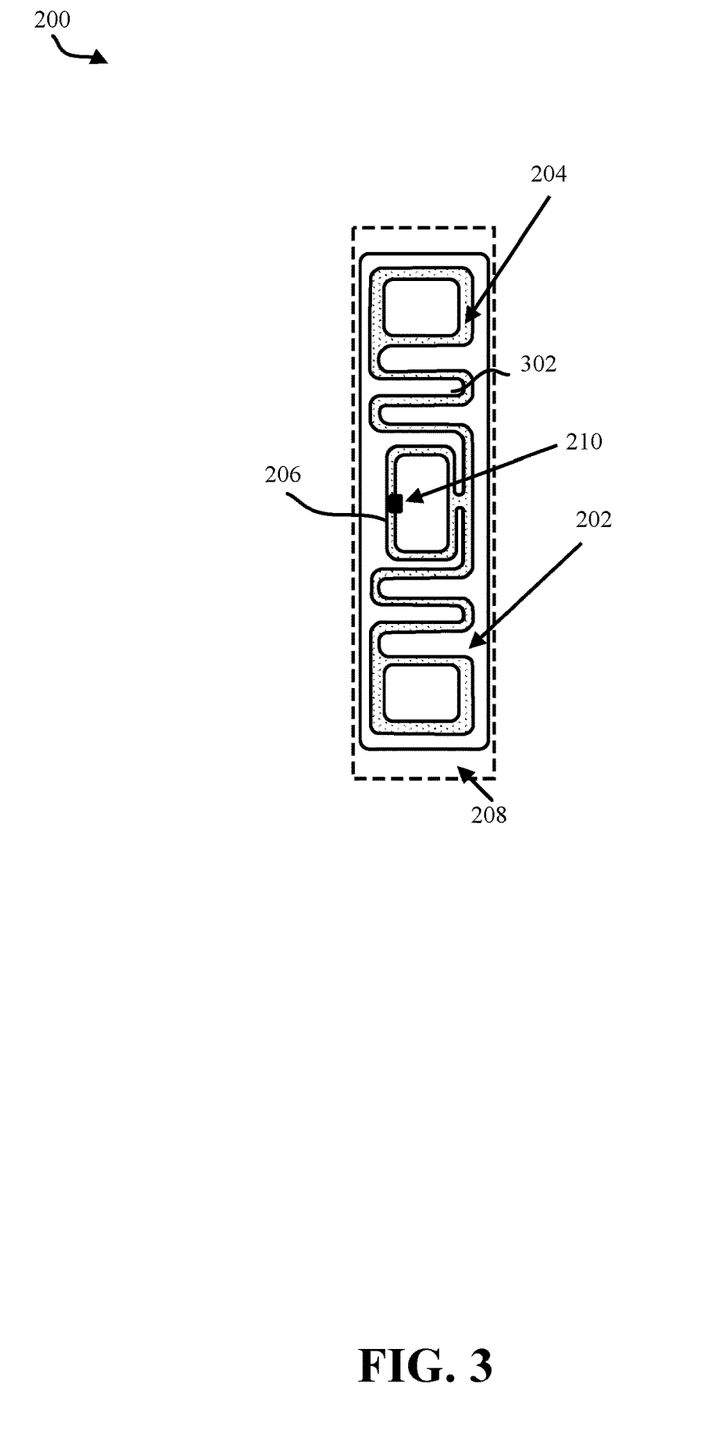
FIG. 3 is an isometric view of an alternative architecture for a tag according to some present aspects.

Security tag 200 may include, for example, a semiconductor integrated circuit 210, e.g., an RFID chip, which provides the RFID-based functionality described above, electrically connected to a tunable antenna 204 that enables the circuit 210 to receive and/or transmit signals, and may be mounted on an inlay 202. The tunable antenna 204 may include a loop portion 206 as shown in FIGS. 2 and 3. The tunable antenna 204 may be tuned to a desired operating frequency by adjusting the length of the tunable antenna 204. The range of operating frequencies may vary. In one embodiment, for example, the tunable antenna 204 may be tuned to operate within an RFID operating frequency.

The inlay 202 to which the semiconductor integrated circuit 210 and the tunable antenna 204 are attached may be a relatively thin, narrow, light-weight, and water soluble substrate. In one aspect, the inlay 202 may be an elongated inlay 202 having a length substantially equal to or slightly greater than a length of the tunable antenna 204. In other words, the longitudinal length of the elongated inlay 202 and the longitudinal length of the tunable antenna 204 may be substantially equal.

The inlay 202 may include, but is not limited to, any type of water soluble material (e.g., a cold water soluble material), non woven material or film material. In some embodiments, the water soluble material may be a fabric material or a film material, and such fabric material may be nonwoven. In an embodiment, the fabric material may be a cold water soluble nonwoven material manufactured from partially hydrolyzed polyvinyl alcohol fibers (a PVA fabric). In an embodiment, the PVA fabric may substantially retain water until the water soluble material of the inlay 202 disintegrates during a wash cycle. In an aspect, the biodegradable material may be a biodegradable paper material or another hydrophilic material. A thickness of the inlay 202 may be selected so that the inlay 202 has a physical strength that allows a threshold amount of tension and/or compression to be maintained on the security tag 200 while attaching the tag to an object 110/116. For example, but not limited hereto, the thickness can have a value between approximately 10 um and approximately 200 um. Further, for example but not limited hereto, a width of the inlay 202 may be between approximately 2.5 mm and approximately 5 mm, which is small enough so that the security tag 200 is not felt by humans when inserted into an object. It should be understood that the present solution is not limited to the particulars of this example.

In some aspects, the inlay 202 may comprise a polyester (e.g., PET) substrate.

In some aspects, at least a portion of the tunable antenna 204 of the security tag 200 may be formed as conductive trace(s) 302 (see FIG. 3) via etching. The conductive trace/layer may be, but is not limited to, aluminum. In this case, only the inductive loop portion 206 of the tunable antenna 204 may be formed from a water soluble material. Advantageously, this implementation enables to produce the largest part of the security tag 200 (the conductive traces 302 of the tunable antenna 204) with conventional methods and materials.

Generally speaking, the resonance characteristics and tuning (and tunability) of the tunable antenna 204 may be determined not only by the antenna geometric shape and dimensions, material layering and construction, and fabrication materials, but also by the characteristics of the environment surrounding the antenna. Types of antennas that may be used in the security tag 200 may include dipole antennas, patch antennas, slot antennas, and many other types and variations of these types. The tunable antenna 204 may be designed so that the operating frequency of the security tag 200 is an ultra high frequency (UHF).

The tunable antenna 204 may be configured to electrically couple with the circuit 210, such as via inductance. The tunable antenna 204 may longitudinally extend across substantially the entire length of the security tag 200. The tunable antenna 204 may be fabricated by positioning a water-soluble conducting ink on the inlay 202. Materials used for the conductive ink may include, but are not limited to, a metal particle, including but not limited to, silver, copper, graphene, a flux, a dispersing agent, an inorganic binder, a metal oxide, an organic metal compound, or a mixture of two or more thereof. However, in various implementations, the tunable antenna 204 may be made of conductive wire, like copper wire, steel wire, and the like.

In some aspects, but not limited hereto, the tunable antenna 204 may extend along the security tag 200 in a longitudinal direction and may have a diameter around 100 microns.

Additionally, the security tag 200 may further include an elongated protective sleeve 208 which substantially encapsulates the inlay 202, the tunable antenna 204, the loop portion 206, and the circuit 210. The protective sleeve 208 may be formed of a fabric or a plastic material, and may be a single sheet wrapped around the internal components and sealed or fixed together on one side, or two opposing sheets sealed or fixed together on each side.

In the present aspects, the security tag 200 may be flexible, bendable, stretchable, or otherwise configured and/or constructed to sustain deformations. Further, for example but not limited hereto, a width of the security tag 200 may be between 3.5 mm and 6 mm, and a length of the security tag 200 may be between 80 mm and 145 mm which is small enough so that the tag is not felt by humans when inserted into an item. The present aspects are not limited to the particulars of this example. Also, the flexibility of the security tag 200 allows for the security tag 200 to be constructed and arranged so that the aforementioned deformations do not negatively affect the functionality and operation of the electronic components disposed within the security tag 200. In some aspects, electronic components are positioned on one side off a center of the security tag 200, so that a stitching lane may be created for secure attachment of the security tag 200 to an article of clothing. In some aspects, the security tag 200 may be manufactured to satisfy standards of environmental sustainability. For example, in some aspects, a natural-fiber fabric, recycled materials, or bio-based materials may be used as the inlay 202 (or as a portion of the inlay 202) so that the security tag 200 incorporates less plastic material than conventional security tags. Recycled materials may include, but are not limited to, recycled polyester or recycled paper, and bio-materials may include, but are not limited to, biopolymers or paper.

Referring more specifically to FIG. 3, an example of an alternative architecture for the security tag 200 is provided. In this example architecture, the integrated circuit 210 and the loop portion 206 may be incorporated into the design of the tunable antenna 204. In an aspect, the tunable antenna 204 may include a rectangular loop antenna, which is inherently differential.

The inlay 202 material may include, but is not limited to, standard paper or water dissolvable paper. It should be noted that portions of the paper which are not completely dissolved during a wash cycle may remain inside the protective sleeve 208.

In summary, the security tag 200 may be produced by combining different material and/or component layers, such as the tunable antenna 204 attached to the inlay 202, the intermediate layer including a semiconductor integrated circuit 210 electrically coupled with a loop portion 206, such as via inductive coupling, and the outer layer including an elongated protective sleeve 208, such as formed from a fabric, that covers the semiconductor integrated circuit 210, the tunable antenna 204, and the inlay 202. The protective sleeve 208 may comprise an ultrasonically weldable thermoplastic material, such as, but not limited to, nylon, combination of polyester and cotton, and the like. Advantageously, the tunable antenna 204 is designed to be very narrow as compared to typical RFID antennas. Although the protective sleeve 208 in this example is illustrated as a top layer, it should be understood that the outer layer may alternatively or additionally include a bottom layer. In one implementation, the elongated protective sleeve 208 includes a single textile sheet having a first longitudinal side fixedly attached to an opposite, second longitudinal side.

Figure 4:
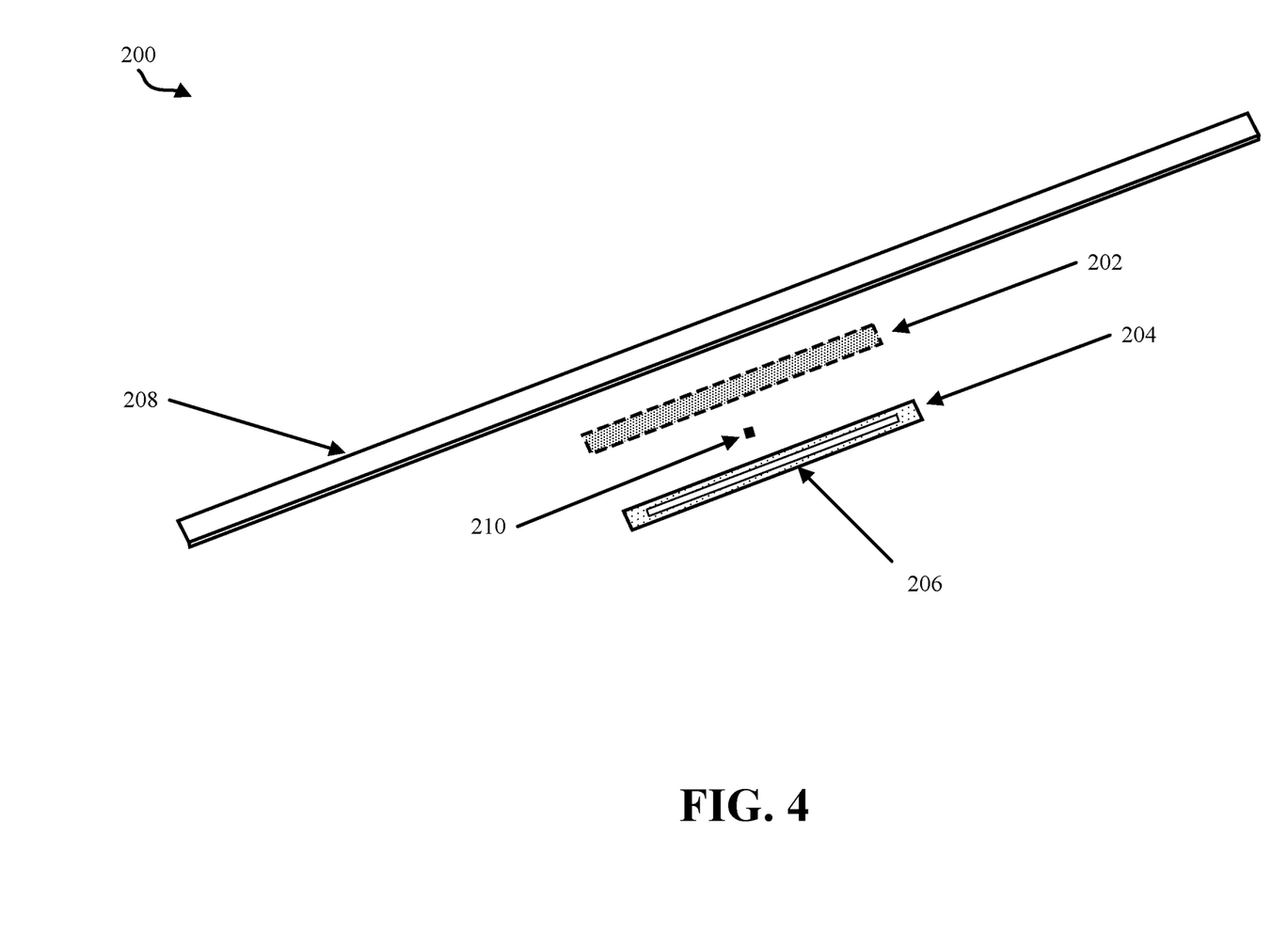
FIG. 4 is an exploded perspective view of the architecture of FIG. 2, according to some present aspects.

FIG. 4 is an exploded perspective view of the architecture of FIG. 2, according to some present aspects It should be understood, however, that the various layers may be manufactured and/or assembled in a different manner and/or in a different order and/or by different entities (e.g., antenna manufacturer, tag manufacturer, tag converter entities).

Thus, the methods and structures herein provide a flexible, fabric-like, narrow security tag 200 that can be easily and efficiently attached (sewn) into a space between seams that connect two adjacent layers of material of an article of clothing. The two layers of the article of clothing may be stitched together by overlock stitches. However, in various aspects, the security tag 200 may be sewn, glued, or welded onto any other portion of an article of clothing.

Figure 5:
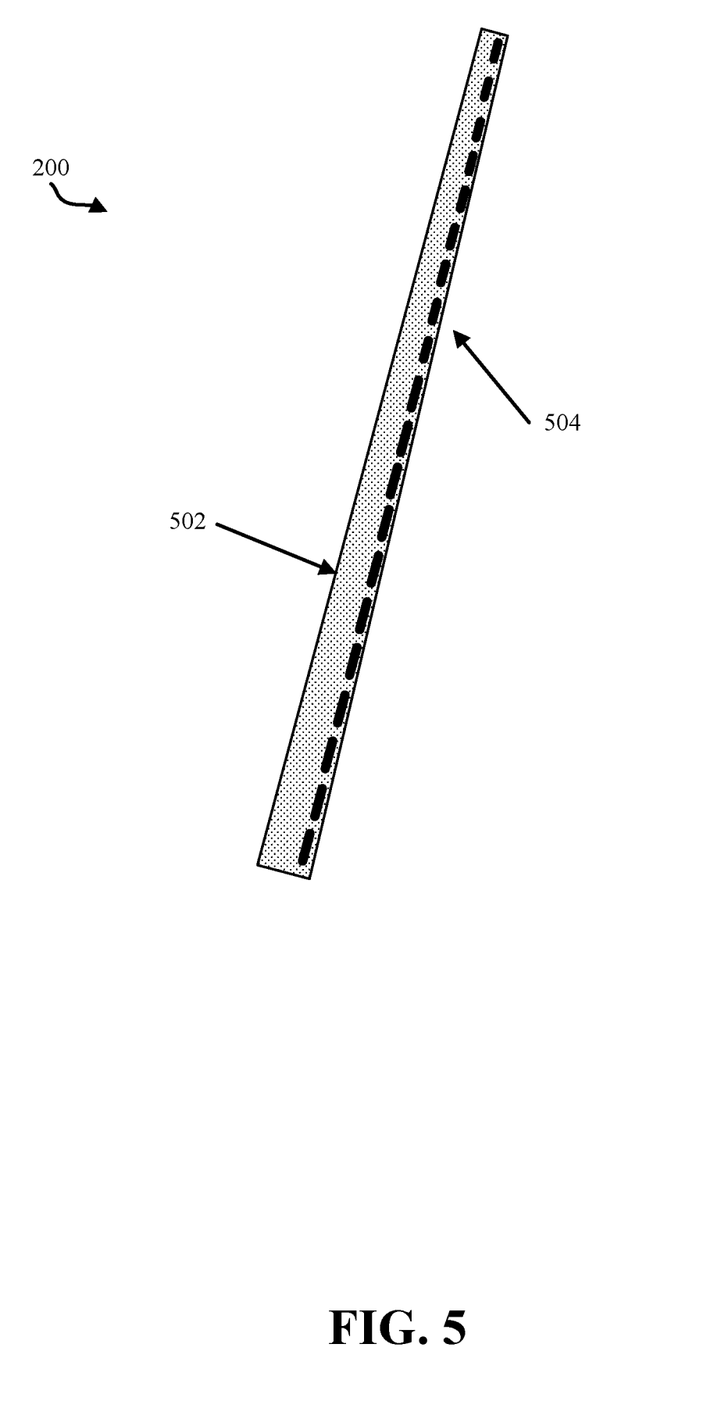
FIG. 5 is a perspective view of a security tag having a welded-on sleeve, according to some present aspects.

Referring to FIG. 5, a completed welded security tag, such a security tag 200 includes the electronic components being positioned on one side 502 off a center of the security tag 200, so that a continuous stitching lane 504 may be created for secure attachment of the security tag 200 to an article of clothing. In other words, since the electronic components are situated on one side of the security tag 200, they are less likely to be damaged by sewing needles when the security tag 200 is attached to an article of clothing.

The disclosed aspects provide a soft, easy to attach, discreet, high-performing, durable, and economical RFID security tag having one or more water soluble components. In an aspect, such a tag can be attached to an overlock seam of the article. For example, some disclosed aspects replace a majority of a PET inlay with a water soluble inlay having a conductive ink antenna in the core of a fabric sleeve. Advantageously, the disclosed aspects enable tagging of thin, lightweight, one-ply garments, which are difficult to tag with any existing tagging solutions. As yet another advantage, the disclosed tag can be easily disabled during a first wash cycle of the garment.

In other words, one aspect of the security tag includes: an elongated inlay portion; an antenna mounted on the elongated inlay portion; and a radio frequency identifier (RFID) circuit coupled with the antenna. The security tag may be encapsulated within an elongated textile protective sleeve. At least one of the elongated inlay portion, the antenna, or the RFID circuit are adapted to dissolve in water.

In one or any combination of these aspects, the antenna is configured to operate at ultra high frequency (UHF).

In one or any combination of these aspects, the elongated inlay portion includes at least one of: a biodegradable material and a water soluble material.

In one or any combination of these aspects, the water soluble material includes at least one of: a nonwoven material and a film material.

In one or any combination of these aspects, the textile protective sleep includes a non-soluble material.

In one or any combination of these aspects, the antenna is attached to an induction loop and the antenna extends along the security tag in a longitudinal direction, wherein the antenna includes a water soluble material and wherein the induction loop includes a non-soluble material.

In one or any combination of these aspects, the antenna is mounted using a water soluble conductive ink.

In one or any combination of these aspects, the elongated textile protective sleeve includes a single textile sheet having a first longitudinal side fixedly attached to an opposite, second longitudinal side.

In one or any combination of these aspects, the elongated textile protective sleeve includes a single textile sheet having a first longitudinal sides fixedly attached to an opposite, second longitudinal side on a first longitudinal tag side off a center of the security tag, and wherein the antenna and the RFID circuit are positioned on a second longitudinal tag side opposite the first longitudinal tag side.

In one or any combination of these aspects, the security tag is configured to be positioned into an interface space between two layers of an article of clothing.

In one or any combination of these aspects, the security tag is configured to be positioned on top of an overlock seam of an article of clothing.

Another aspect of a security tag include: an elongated inlay portion; an antenna mounted on the elongated inlay portion; and a radio frequency identifier (RFID) circuit coupled with the antenna, wherein at least a portion of the security tag is adapted to dissolve in water.

In one or any combination of these aspects, the portion comprises the elongated inlay portion.

In one or any combination of these aspects, the portion comprises the antenna.

In one or any combination of these aspects, the portion comprises the RFID circuit.

In one or any combination of these aspects, the portion comprises at least one of: a biodegradable material and a water soluble material.

In one or any combination of these aspects, the water soluble material comprises at least one of: a nonwoven material and a film material.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A security tag, comprising:
   an elongated inlay portion;
   an antenna mounted on the elongated inlay portion;
   a radio frequency identification (RFID) circuit coupled with the antenna;
   a first textile material layer; and
   a second textile material layer;
   wherein the first textile material layer is fixedly attached to the second textile material layer on at least one longitudinal side in a manner that non-fixedly contains the elongated inlay portion, the antenna, and the RFID circuit, and
   wherein the antenna is coupled with an induction loop and the antenna extends along the security tag in a longitudinal direction.

2. The security tag of claim 1, wherein the antenna is configured to operate at ultra high frequency (UHF).

3. The security tag of claim 1, wherein the security tag is encapsulated within an elongated textile protective sleeve defined by the first textile material layer and the second textile material layer.

4. The security tag of claim 3, wherein the elongated textile protective sleeve comprises a non-soluble material.

5. The security tag of claim 3, wherein the elongated textile protective sleeve comprises a single textile sheet having a first longitudinal side fixedly attached to an opposite, second longitudinal side.

6. The security tag of claim 3, wherein the elongated textile protective sleeve comprises a single textile sheet having a first longitudinal side fixedly coupled with an opposite, second longitudinal side on a first longitudinal tag side off a center of the security tag.

7. The security tag of claim 6, wherein the antenna and the RFID circuit are positioned on a second longitudinal tag side opposite the first longitudinal tag side.

8. The security tag of claim 1, wherein the security tag is configured to be positioned between two layers of an article of clothing.

9. The security tag of claim 1, wherein the security tag is configured to be positioned on top of an overlock seam of an article of clothing.

10. The security tag of claim 1, wherein first textile material layer and the second textile material layer comprise an ultrasonically weldable material.

11. The security tag of claim 1, wherein the elongated inlay portion, the antenna, and the RFID circuit are moveable within the first textile material layer that is fixedly attached to the second textile material layer.

12. The security tag of claim 1, wherein the first textile material layer has a first longitudinal side and the second textile material layer has a second longitudinal side, wherein the first textile material layer and the second textile material layer are formed from a single sheet of a textile material folded around the elongated inlay portion, the antenna, and the RFID circuit, and wherein the first longitudinal side is fixedly attached to the second longitudinal side.

13. The security tag of claim 10, further comprising:
   a stitching lane for attaching the security tag to an article of clothing, wherein the stitching lane is located along a longitudinal side of the security tag;
   wherein the security tag extends along a first longitudinal center axis; and
   wherein the elongated inlay portion, the antenna, and the RFID circuit extend along a second longitudinal center axis spaced apart from the first longitudinal center axis in a direction away from the stitching lane.

14. The security tag of claim 13, wherein the security tag is sufficiently flexible to be inserted into a space between two seams of the article of clothing.

15. The security tag of claim 1, wherein the first textile material layer is fixedly attached to the second textile material layer without adhesive.

16. The security tag of claim 15, wherein the elongated inlay portion comprises at least one of: a biodegradable material and a water soluble material.

17. The security tag of claim 16, wherein the water soluble material comprises at least one of: a nonwoven material and a film material.

18. The security tag of claim 15, wherein the antenna comprises a water soluble material and wherein the induction loop comprises a non-soluble material.

19. The security tag of claim 15, wherein the antenna is mounted using a water soluble conductive ink.

20. The security tag of claim 1, wherein at least one of the elongated inlay portion, the antenna, or the RFID circuit are adapted to dissolve in water.

21. The security tag of claim 1, wherein the security tag has a fabric-like flexibility.

22. A security tag, comprising:
   an elongated inlay portion;
   an antenna mounted on the elongated inlay portion;
   a radio frequency identification (RFID) circuit coupled with the antenna;
   a first textile material layer; and
   a second textile material layer;
   wherein the first textile material layer is fixedly attached to the second textile material layer on at least one longitudinal side in a manner that non-fixedly contains the elongated inlay portion, the antenna, and the RFID circuit,
   wherein the security tag is encapsulated within an elongated textile protective sleeve defined by the first textile material layer and the second textile material layer, and
   wherein the elongated textile protective sleeve comprises a single textile sheet having a first longitudinal side fixedly attached to an opposite, second longitudinal side.

23. A security tag, comprising:
   an elongated inlay portion;
   an antenna mounted on the elongated inlay portion;
   a radio frequency identification (RFID) circuit coupled with the antenna;
   a first textile material layer;
   a second textile material layer;
   a stitching lane for attaching the security tag to an article of clothing, wherein the stitching lane is located along a longitudinal side of the security tag;
   wherein the security tag extends along a first longitudinal center axis; and
   wherein the elongated inlay portion, the antenna, and the RFID circuit extend along a second longitudinal center axis spaced apart from the first longitudinal center axis in a direction away from the stitching lane,
   wherein the first textile material layer is fixedly attached to the second textile material layer on at least one longitudinal side in a manner that non-fixedly contains the elongated inlay portion, the antenna, and the RFID circuit, and
   wherein first textile material layer and the second textile material layer comprise an ultrasonically weldable material.

* * * * *